(12) United States Patent
Nozawa

(10) Patent No.: US 6,788,879 B1
(45) Date of Patent: Sep. 7, 2004

(54) IMAGE SIGNAL PROCESSING APPARATUS

(75) Inventor: Shingo Nozawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/431,268

(22) Filed: Nov. 1, 1999

(30) Foreign Application Priority Data

Nov. 6, 1998 (JP) .......................................... 10-315765

(51) Int. Cl.⁷ ................................................ H04N 5/95
(52) U.S. Cl. ......................... 386/89; 386/124; 370/486
(58) Field of Search ....................... 386/1, 4, 45, 52–53, 386/55, 64, 89, 95, 124, 125–126; 360/13, 15; 370/486, 487, 517, 519

(56) References Cited

U.S. PATENT DOCUMENTS

| 4,706,135 A | * | 11/1987 | Kojima ........................ 386/53 |
| 5,166,835 A | * | 11/1992 | Tanizawa ..................... 360/13 |
| 5,625,461 A | * | 4/1997 | Okamoto et al. ............. 386/95 |
| 5,638,224 A | * | 6/1997 | Nakatani ..................... 360/15 |
| 5,802,226 A | * | 9/1998 | Dischert et al. .............. 386/53 |

* cited by examiner

Primary Examiner—Thai Tran
Assistant Examiner—Christopher Onuaku
(74) Attorney, Agent, or Firm—Fitzpatrick, Cella, Harper & Scinto

(57) ABSTRACT

A signal processing apparatus receives a signal train including image signals of a plurality of frames and additional signals added to the image signals on a frame unit basis for controlling the processes for the image signals, delays the received image signals in accordance with the additional signals, and processes the delayed image signals in accordance with the additional signals.

21 Claims, 6 Drawing Sheets

IMAGE SIGNAL PROCESSING APPARATUS

BACKGROUND OF THE INVENTION

1. Field of the Invention

The present invention relates to an image signal processing apparatus, and more particularly to an editing processing for an image signal.

2. Related Background Art

With recent advancement of digital signal processing techniques, it becomes possible to encode a large amount of digital data such as moving images, still images and audio signals and to record the encoded data in a magnetic recording medium or transmit it over a communication medium. A system for editing image signals under high efficiency coding by using such digital signal processing techniques is being studied.

FIG. 1 is a block diagram showing the structure of such an editing system.

In FIG. 1, reference numeral 401 represents an image signal input terminal, reference numeral 402 represents a process control signal input terminal, reference numeral 403 represents a recording control signal input terminal, reference numeral 404 represents a processing circuit, and reference numeral 405 represents a recording circuit.

The operation of this system will be described.

An image signal input from the image signal input terminal 401 is processed by the processing circuit 404. Generally, in a moving image editing process, processes such as fading and wiping are executed. In accordance with a process control signal input from the process control signal input terminal 402, the processing circuit 404 determines the type of a process, start and end timings of the process. The image signal processed by the processing circuit 404 is supplied to the recording circuit 405 and recorded in a storage medium. In accordance with a record control signal from the record control signal input terminal 403, the recording circuit 405 determines start and end timings of the recording.

In such an editing system, the image signal is transferred on the frame unit basis, whereas the process control signal and record control signal are asynchronously transferred by using a transfer path different from that of the image signal. Therefore, as shown in FIG. 2, the input timing of the process control signal may become different from the timing of each frame of the image signal. Also during the recording process, the input timing of the record control signal may become different from the timing of each frame of the image signal because of a difference between delay times specific to respective systems. In such a case, a proper editing process is impossible.

In order to solve this problem, an operator finely adjusts the output timings of the image signal and each control signal externally from the editing system. However, this timing adjustment requires very sophisticated experiences and is different for each system. Therefore, the manual timing adjustment is very difficult.

SUMMARY OF THE INVENTION

It is an object of the present invention to solve the above-described problem.

It is another object of the present invention to realize an editing process which is very easy and excellent.

Under these objects, according to one aspect of the present invention, there is provided a signal processing apparatus comprising: input means for inputting an information signal train including image signals of a plurality of frames and additional signals for controlling a process for the image signals, the additional signal being added to the image signal on a frame unit basis; delay means for delaying an input image signal; processing means for processing the image signal output from the delay means; and control means for controlling a process operation to be executed by the processing means and a delay operation to be executed by the delay means, in accordance with the additional signal.

It is a further object of the present invention to provide an editing process capable of easily processing images on the frame unit basis.

The other objects and features of the present invention will become apparent from the following detailed description when read in conjunction with the accompanying drawings.

DETAILED DESCRIPTION OF THE PREFERRED EMBODIMENTS

Preferred embodiments of the invention will be detailed with reference to the accompanying drawings.

Figure 4:
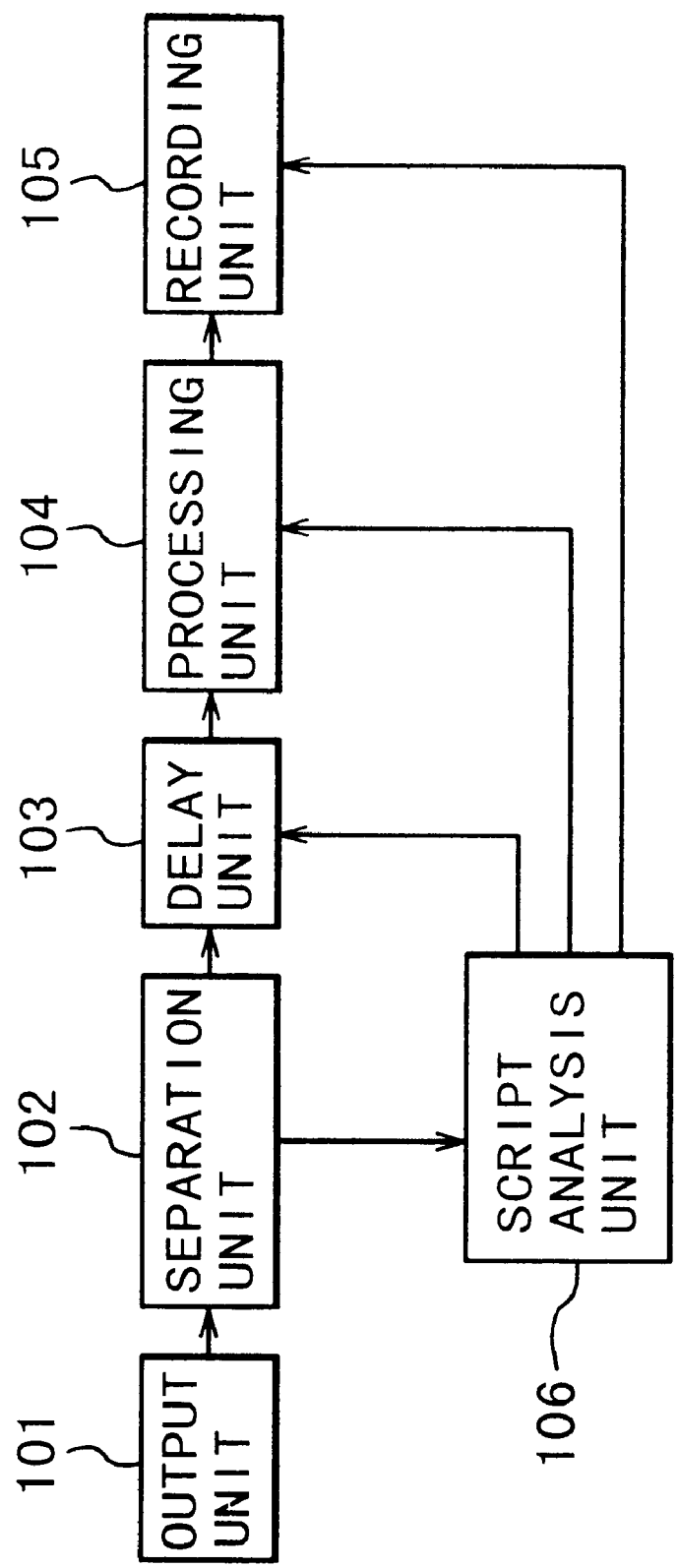
FIG. 4 is a diagram showing the structure of an editing system according to an embodiment of the invention.

FIG. 4 is a block diagram showing the structure of an image processing system according to an embodiment of the invention.

In FIG. 4, the image processing system includes an output unit 101, a separation unit 102, a delay unit 103, a processing unit 104, a recording unit 105 and a script analysis unit 106. The output unit 101 such as a VTR outputs an image signal and a script signal. In accordance with this script signal, the image signal is subjected to processing, recording and the like.

The operation of this system will be described.

The output unit 101 generates and outputs a stream signal. The stream signal is a multiplexed signal of an image signal and a script signal. The image signal is constituted of a plurality of frames, and the script signal train is used as control commands for processing and recording the image signal and is synchronous with the image signal on the frame unit basis. The stream signal is supplied to the separation unit 102 which separates it into an image signal train for each frame and the script signal train. The separated image signal train is supplied to the delay unit 103, and the separated script signal train is supplied to the script analysis unit 106.

Figure 5:
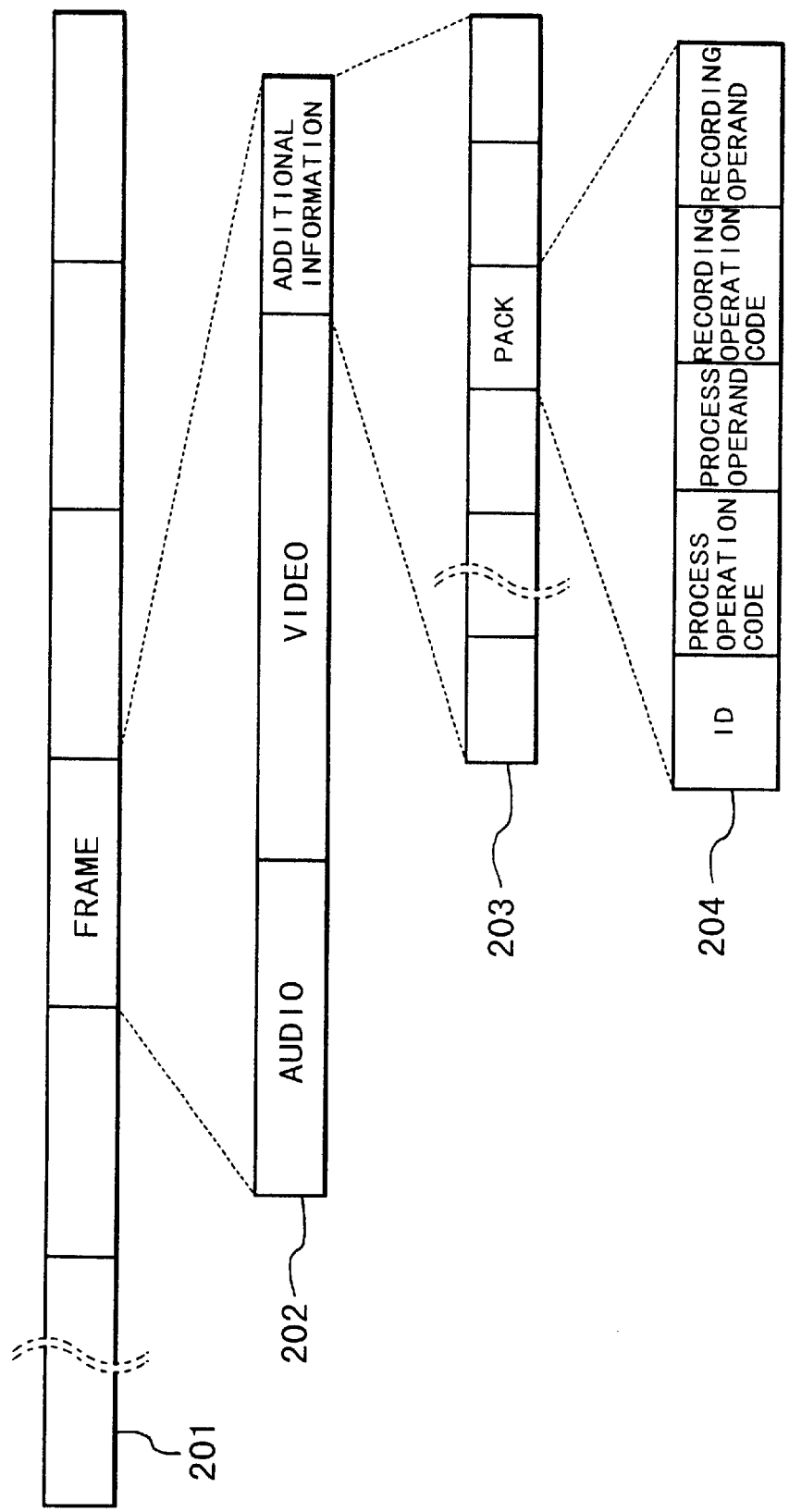
FIG. 5 is a diagram showing a signal train to be transferred by the system shown in FIG. 4.

FIG. 5 shows the structure of the stream signal to be supplied from the output unit 1 to the separation unit 102.

A stream signal 201 is constituted of a plurality of frame signals 202. Each frame signal is constituted of three blocks:

one frame video signal; one frame audio signal; and an additional signal containing information on the audio and video signals. The additional signal block 203 is constituted of a plurality of packs 204 each being digital data having a predetermined number of bits. The script signal is multiplexed as one pack 204. Each pack is constituted of five information words: an ID indicating that the pack is the script signal; an operation code and an operand of the processing unit 104; and an operation code and an operand of the recording unit 105.

The processing operation code includes control signals for the editing process such as fade-in and fade-out, an image display, and an interactive process such as a pop-up of a display window. The processing operand includes information associated with the processing operation code. The recording operation code includes control signals for the recording process such as record start and end timings. The recording operand includes information associated with the processing operation code.

The script analysis unit 106 analyzes the script signal train supplied from the separation unit 102, outputs a delay time control signal to the delay unit 103 in accordance with the process contents of each script signal, and also outputs a control signal to the processing unit 104 and recording unit 105.

For example, if the processing operation code of the script signal contains a control signal instructing "fade-out", a process control signal for instructing the execution of a fade-out process is output to the processing unit 104.

If the recording operation code of the script signal contains a control signal instructing "record start", a record control signal instructing a record start is output to the recording unit 105 and a delay control signal is output to the delay unit 103 to make the latter delay the image signal by a time corresponding to a time interval from when the recording unit 105 receives the record control signal to when the recording unit 105 actually starts the record operation.

In accordance with the delay control signal supplied from the script analysis unit 106, the delay unit 103 delays and outputs the image signal train supplied from the separation unit 102.

Figure 6:
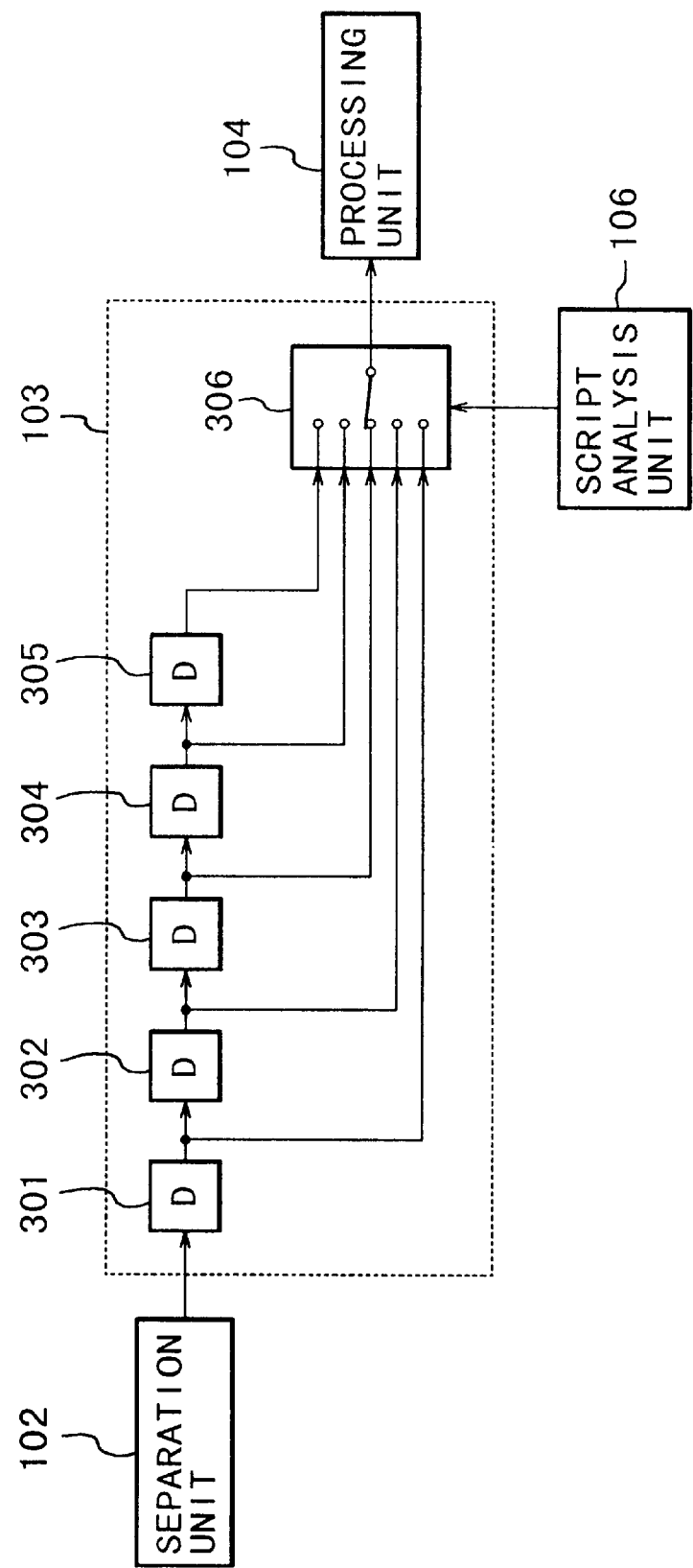
FIG. 6 is a diagram showing a delay unit shown in FIG. 4.

FIG. 6 is a diagram showing the delay unit 103 and its peripheral circuits. In FIG. 6, like elements to those shown in FIG. 4 are represented by using identical reference numerals.

Reference numerals 301 to 305 represent latch units for sequentially holding each frame of the image signal train output from the separation unit 102. Each latch unit provides one frame delay, and a plurality of latch units provide a delay corresponding to a plurality of frames.

An output of each latch unit is output to a switch 306 which in accordance with the delay control signal supplied from the script analysis unit 106, selects the output signal from the corresponding latch unit and outputs it to the processing unit 104. In this case, the script analysis unit 106 sets the delay time by taking into consideration both the process by the processing unit 104 and the recording process by the recording unit 105.

The image signal train output from the switch 306 is supplied to the processing unit 104. In accordance with the process control signal supplied from the script analysis unit 106, the processing unit 104 processes the image signal train output from the delay unit 103 and outputs the processed image signal to the recording unit 105. In accordance with the record control signal supplied from the script analysis unit 106, the recording unit 105 records the image signal train supplied from the processing unit 104 in a storage medium.

As described above, according to this embodiment, the output unit adds the script signal to the image signal on the frame unit basis, and multiplexes the image signal and script signal and outputs the multiplexed signal. Therefore, the image signal can be edited on the frame unit basis by using a simple circuit structure.

Further, the delay time of the image signal is adjusted in accordance with the process contents of the script signal output from the output unit. It is therefore possible to execute the editing process for the image signal at a correct timing. Furthermore, since the delay unit absorbs the response delay of the processing unit and recording unit, it is easy to adjust a difference between the processing timing and recording timing.

Next, the editing system shown in FIG. 4 applied to an editing system having a VTR and an editing apparatus will be described with reference to FIG. 7.

Figure 7:
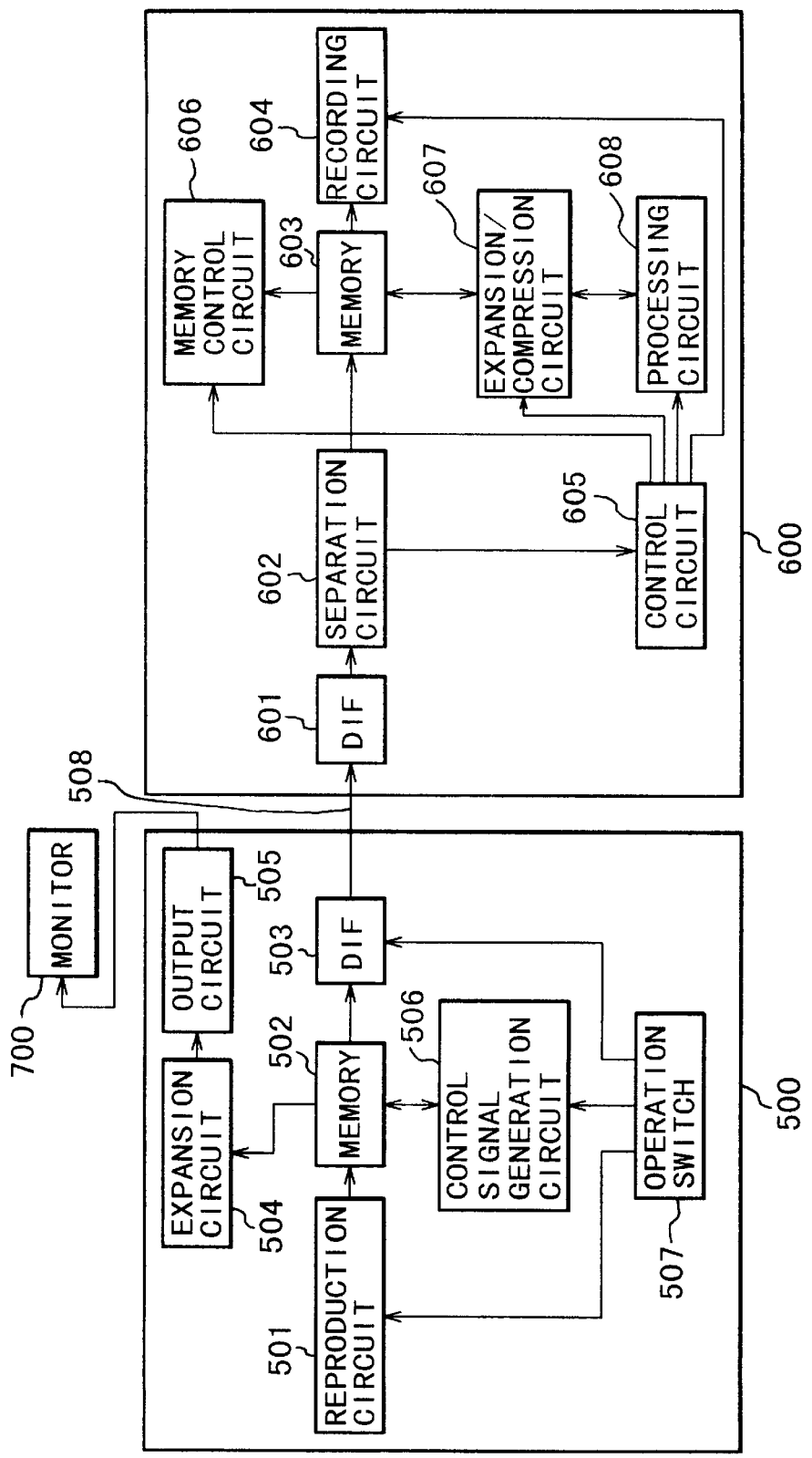
FIG. 7 is a diagram showing the structure of an editing system according to another embodiment of the invention.

FIG. 7 is a block diagram showing the structure of main parts of an editing system having a digital VTR 500, an editing apparatus 600 and a monitor 700.

Referring to FIG. 7, upon reception of a reproduction instruction from an operation switch 507, a reproduction circuit 501 reproduces video and audio signals from an unrepresented magnetic tape and outputs them to a memory 502. The memory 502 stores the reproduced video and audio signals of a plurality of frames and outputs them to an expansion circuit 504. The reproduced image signal have been highly efficiently encoded by using known DCT, variable length coding or the like to compress its information amount. The expansion circuit 504 decodes the reproduced image signal to expand the information amount and outputs it to an output circuit 505. The output circuit 505 converts the reproduced image signal supplied from the expansion circuit 504 into a signal suitable for the monitor 700 and outputs the converted signal to the monitor 700. The monitor 700 displays the image corresponding to the image signal supplied from the output circuit 505.

A user monitors the reproduced moving image displayed on the monitor 700 and instructs to start the editing process for the reproduced image signal by actuating the operation switch 507. Specifically, the user instructs to start the editing process such as a record start, record end, fading, and wiping.

Upon reception of an instruction from the operation switch 507, a control signal generation circuit 506 generates a script signal corresponding to the instructed editing process, reads a time code or track number added to the instructed reproduced image signal from the memory 502, and loads the script signal and the time code or track number in an internal register.

Figure 1:
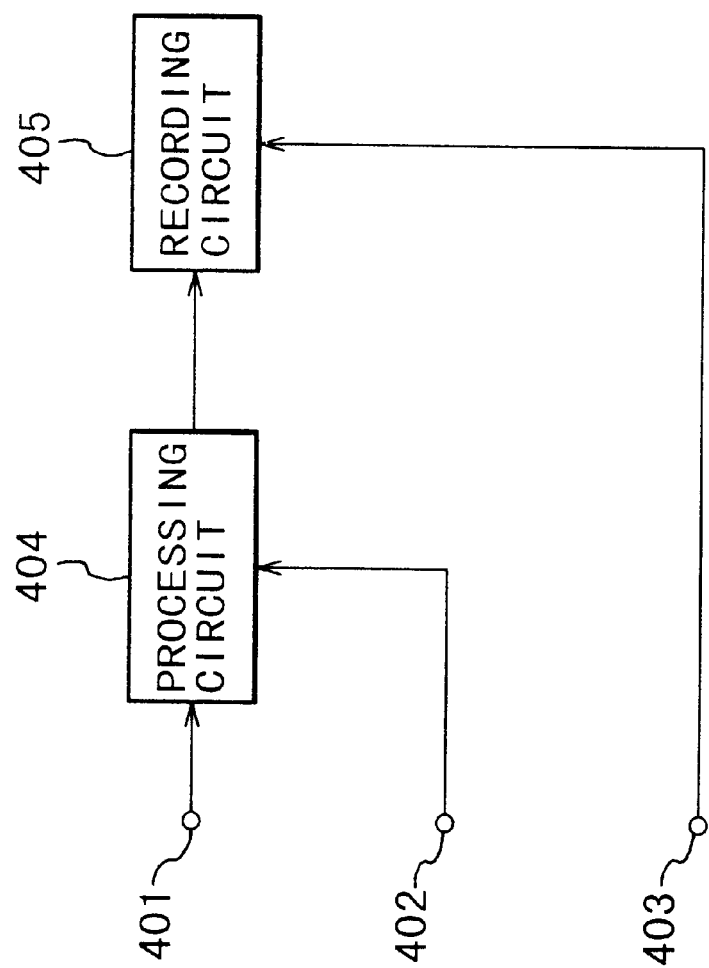
FIG. 1 is a diagram showing an example of the structure of an editing system.
Figure 2:
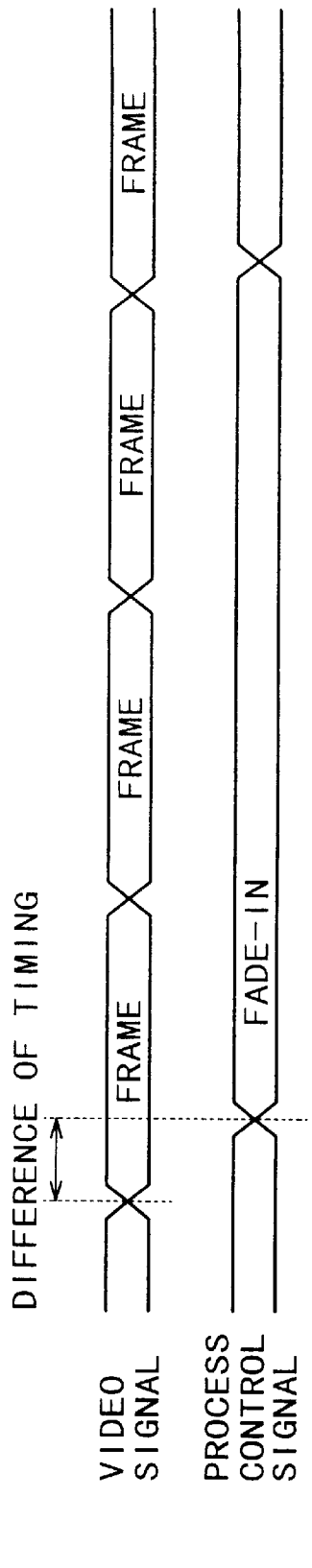
FIG. 2 is a timing chart illustrating the operation of the editing system shown in FIG. 1.
Figure 3:
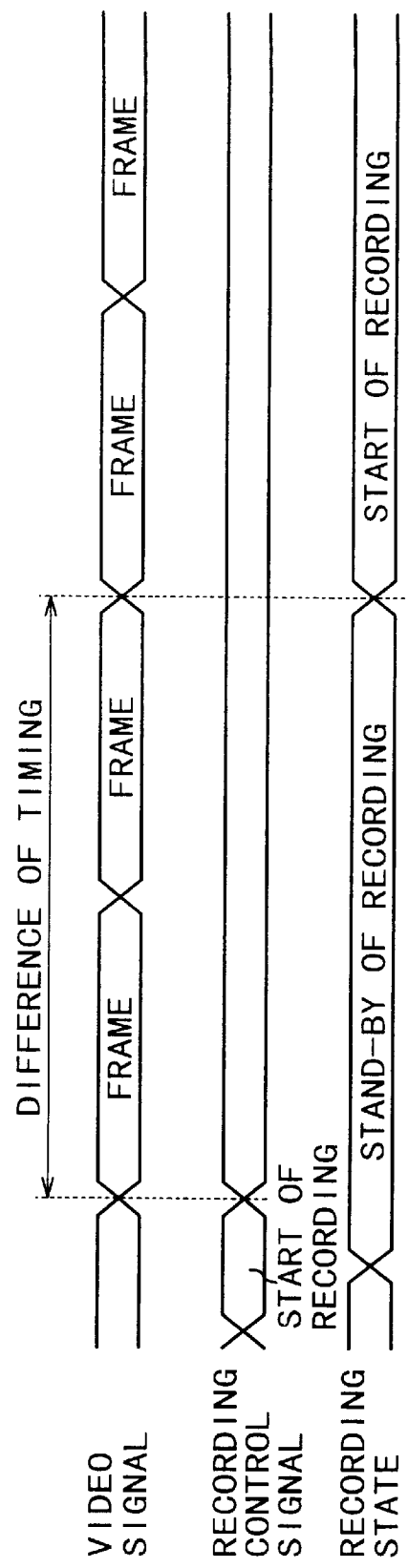
FIG. 3 is a timing chart illustrating the operation of the editing system shown in FIG. 1.

Upon completion of an editing instruction by the user described above, the user instructs to output the image signal to the editing apparatus 600 by actuating the operation switch 507. In response to this output instruction, the reproduction circuit 501 again reproduces video and audio signals and outputs them to the memory 502. Also in response to the output instruction by the operation switch 507, the control signal generation circuit 506 reads the previously generated and loaded script signal and adds it to the reproduced image signal having the corresponding time code or track number, on the frame unit basis. The generated stream signal having the format shown in FIG. 3 is output to a DIF 503. In this case, the reproduced image signal in an encoded state is output to DIF 503.

In response to the instruction by the operation switch 507, DIF 503 outputs the stream signal train supplied from the memory 502 to a DIF 601 of the editing apparatus 600 via a transmission line 508 by using the format in conformity with IEEE 1394.

Next, in the editing apparatus 600, DIF 601 receives the stream signal train output from DIF 503 of VTR 500 and outputs it to a separation circuit 602. The separation circuit 602 separates the received stream signal train into video, audio, script signals in accordance with a header (ID) added to each script signal, outputs the audio and video signals to a memory 603, and outputs the script signals to a control circuit 605.

The memory 603 has a capacity capable of storing audio and video signals of several tens frames, and stores the audio and video signals supplied from the separation circuit 602 and outputs them to a recording circuit 604 and a expansion/compression circuit 607, under the control of a memory control circuit 606.

The expansion/compression circuit 607 decodes the image signal read from the memory 603, outputs it to a processing circuit 608, and also encodes the image signal output from the processing circuit 608 to store it in the memory 603.

The recording circuit 604 reads audio and video signals stored in the memory 604 and records them in an unrepresented magnetic tape.

The control circuit 605 analyzes the contents of the script signal supplied from the separation circuit 602, and in accordance with the analyzed contents, controls the memory control circuit 606, expansion/compression circuit 607, processing circuit 608 and recording circuit 604.

For example, if the contents of the script signal indicate the record start, the control circuit 605 instructs the recording circuit 604 to start the record operation, and outputs a control signal to the memory control circuit 606 to instruct the circuit 604 to read the audio and video signals from the memory 603 by taking into consideration the delay time of the actual record start by the recording circuit 604 and to output it to the recording circuit 604.

In this case, the delay time is adjusted by controlling the read timing of the audio and video signals from the memory 603 while considering the delay time of the record start by the recording circuit 604. Therefore, the record can start correctly from the image signal of the frame designated by the user.

Similarly, if the contents of the script signal indicate a fade-out, the image signal stored in the memory 603 is read and decoded to be output to the processing circuit 608. At the same time, the control circuit 605 outputs a control signal to the expansion/compression circuit 607 to instruct the circuit 607 to again encode the image signal processed by the processing circuit 608 and to store it in the memory 603, and outputs a control signal to the processing circuit 608 to instruct the circuit 608 to perform a fade-out process by gradually lowering the level of the image signal supplied from the expansion/compression circuit 607 and to output it again to the expansion/compression circuit 607.

In this case, a control signal is output to the memory control circuit 606 to advance the output timing from the memory 603 to the expansion/compression circuit 607 in response to the instruction of the fade-out to the processing circuit 608, by considering the delay time required by the decoding operation by the expansion/compression circuit 607.

In this case, the delay time is adjusted by controlling the read timing of the audio and video signals from the memory 603 while considering the delay time required for the process by the expansion/compression circuit 607. Therefore, the fade-out process can be performed correctly from the timing designated by the user.

In other cases, similarly, the output timing of the audio and video signals from the memory 603 is controlled in accordance with the process contents of each script signal. It is therefore possible to perform the editing and recording processes correctly at the timing designated by the user.

As described above, according to the system shown in FIG. 7, VTR adds the script signal to the image signal on the frame unit basis, and multiplexes the image signal and script signal and outputs the multiplexed signal. Therefore, the image signal can be edited on the frame unit basis by using a simple circuit structure.

Further, the delay time of the image signal is adjusted in accordance with the process contents of the script signal output from VTR. It is therefore possible to execute the editing process for the image signal at a correct timing. Furthermore, since the control circuit operates to absorbs the response delay of the processing circuit and recording circuit, it is easy to adjust a difference between the processing timing and recording timing.

In the system shown in FIG. 7, the recording circuit 604 records the audio and video signals in a magnetic tape. Instead, the audio and video signals may be stored in an optical disk, a semiconductor memory such as a RAM, or a magnetic disk such as a hard disk. As the memory 603, a semiconductor memory, an optical disk, a magnetic disk or the like respectively having the capacity of several tens frames may also be used.

Although VTR 400 reproduces audio and video signals from a magnetic tape, it may reproduce them from a storage medium such as an optical disk. An image signal picked up with a video camera or the like may also be used.

The system shown in FIG. 4 and VTR and editing apparatus shown in FIG. 7 may be configured either by hardware or a computer system having a CPU, a memory and the like. If a computer system is to be used, a program for realizing the above-described processes of the embodiment is stored.

Such a memory may be a semiconductor memory such as a ROM and a RAM, an optical disk, a magnetooptic disk, a magnetic recording medium or the like.

Such a memory may be used by another system or apparatus different from the systems of the embodiments, and the system or a computer reads and executes the program codes stored in the memory. In this manner, the functions of the embodiment can be realized with similar advantages and the objects of the invention can be achieved.

If an OS or the like running on a computer performs a portion or the whole of the embodiment processes, or a CPU or the like of an expansion board or an expansion function unit performs a portion or the whole of the embodiment processes by using the program codes read from the storage medium and stored in a memory of the board or unit, the functions of the embodiment can also be realized with similar advantages.

Many widely different embodiments of the present invention may be constructed without departing from the spirit and scope of the present invention. It should be understood that the present invention is not limited to the specific embodiments described in the specification, except as defined in the appended claims.

What is claimed is:

1. A signal processing apparatus, comprising:
   an input unit that inputs a multiplexed information signal train including image signals of a plurality of frames and additional signals for controlling a process for the image signals, the additional signals being multiplexed on the image signals on a frame unit basis in the multiplexed information signal train;
   a delay unit that delays the image signals inputted by said input unit;
   a processing unit that processes the image signals outputted from said delay unit; and
   a control unit that controls each of a process operation of said processing unit and a delay operation of said delay unit independently, in accordance with the additional signals inputted by said input unit.

2. An apparatus according to claim 1, wherein the image signals and the additional signals are supplied via a same transmission path.

3. An apparatus according to claim 1, wherein the additional signals include a signal for controlling a plurality of types of processes, and said control unit controls a delay time of an image signal to be delayed by said delay unit in accordance with a type of each process.

4. An apparatus according to claim 1, wherein said processing unit includes a recording unit that records an image signal supplied from said delay unit in a recording medium, and the additional signals include a signal for controlling a record operation of said recording unit.

5. An apparatus according to claim 4, wherein said control unit controls said delay unit so that said delay unit delays the image signal by a time taken for said recording unit to start a record operation after said recording unit receives a control signal instructing a record start from said control unit.

6. An apparatus according to claim 1, wherein each image signal is highly efficiently encoded, and said processing unit includes a decoding unit that decodes the image signals.

7. An apparatus according to claim 1, wherein the additional signals include a script signal comprised of an operation code and an operand.

8. An apparatus according to claim 1, wherein said delay unit includes a memory for storing an inputted image signal of a plurality of frames and a memory control unit that controls reading/writing of the image signal relative to said memory, and said control unit controls said memory control unit to change a read timing of the image signal from said memory in accordance with an additional signal.

9. A signal processing system, comprising:
   a reproduction apparatus for reproducing a digital image signal of a plurality of frames, multiplexing the reproduced digital image signal and an additional signal for controlling a process for the digital image signal to generate a multiplexed information signal train, and outputting the multiplexed information signal train, said reproduction apparatus multiplexing the additional signal and the digital image signal on a frame unit basis; and
   a signal processing apparatus, comprising:
      an input unit that inputs the multiplexed information signal train outputted from said reproduction apparatus;
      a delay unit that delays an inputted digital image signal from said input unit;
      a processing unit that processes the digital image signal outputted from said delay unit; and
      a control unit that controls each of a process operation to be executed by said processing unit and a delay operation to be executed by said delay unit independently, in accordance with the additional signal.

10. A signal processing method comprising the steps of:
    inputting a multiplexed information signal train including image signals of a plurality of frames and additional signals for controlling a process for the image signals, the additional signals being multiplexed on the image signals on a frame unit basis in the multiplexed information signal train;
    delaying the image signals inputted in said inputting step;
    processing the delayed image signals; and
    controlling each of a process operation in said processing step and a delay operation in said delaying step independently, in accordance with the additional signals inputted in said inputting step.

11. A method according to claim 10, wherein the image signals and the additional signals are supplied via a same transmission path.

12. A method according to claim 10, wherein the additional signals include a signal for controlling a plurality of types of processes, and said controlling step controls a delay time of an image signal to be delayed in said delaying step in accordance with a type of each process.

13. A method according to claim 10, wherein said processing step includes a recording step of recording an image signal supplied in said delaying step in a recording medium, and the additional signals include a signal for controlling a record operation of said recording step.

14. A method according to claim 13, wherein said controlling step controls said delaying step so that said delaying step delays an image signal by a time taken for said recording step to start a record operation after a control signal instructing a record start and issued in said controlling step is received.

15. A method according to claim 10, wherein each image signal is highly efficiently encoded, and said processing step includes a decoding step of decoding the image signals.

16. A method according to claim 10, wherein the additional signals include a script signal comprised of an operation code and an operand.

17. A method according to claim 10, wherein said delaying step includes a storage step of storing an inputted image signal of a plurality of frames into a memory and a memory control step of controlling reading/writing of the image signal relative to the memory, and said controlling step controls said memory control step to change a read timing of the image signal from the memory in accordance with an additional signal.

18. A signal processing apparatus for executing a plurality of kinds of processes for an image signal, comprising:
    an input unit that inputs a multiplexed information signal train including image signals of a plurality of frames and additional signals indicating a selected kind of process from the plurality of kinds of processes for the image signals, the additional signals being multiplexed on the image signals on a frame unit basis in the multiplexed information signal train;
    a delay unit that delays the image signals inputted by said input unit;
    a process unit that processes the image signals outputted from said delay unit;
    a separation unit that separates an additional signal from the multiplexed information signal train inputted by said input unit; and a control unit that controls each of said process unit to execute the selected kind of process and a delay time of said delay unit independently, in accordance with the additional signal separated by said separation unit.

19. An apparatus according to claim 18, wherein the image signals and the additional signals are supplied via a same transmission path.

20. An apparatus according to claim 18, wherein the additional signals include a script signal comprised of an operation code and an operand.

21. An apparatus according to claim 18, wherein said delay unit includes a memory for storing an inputted image signal of a plurality of frames and a memory control unit that controls reading/writing of the image signal relative to said memory, and said control unit controls said memory control unit to change a read timing of the image signal from said memory in accordance with an additional signal.

* * * * *